Dec. 11, 1962 W. A. SEUBERT 3,068,137
LARGE AREA FILM FABRICATION
Filed Dec. 23, 1957 2 Sheets-Sheet 1
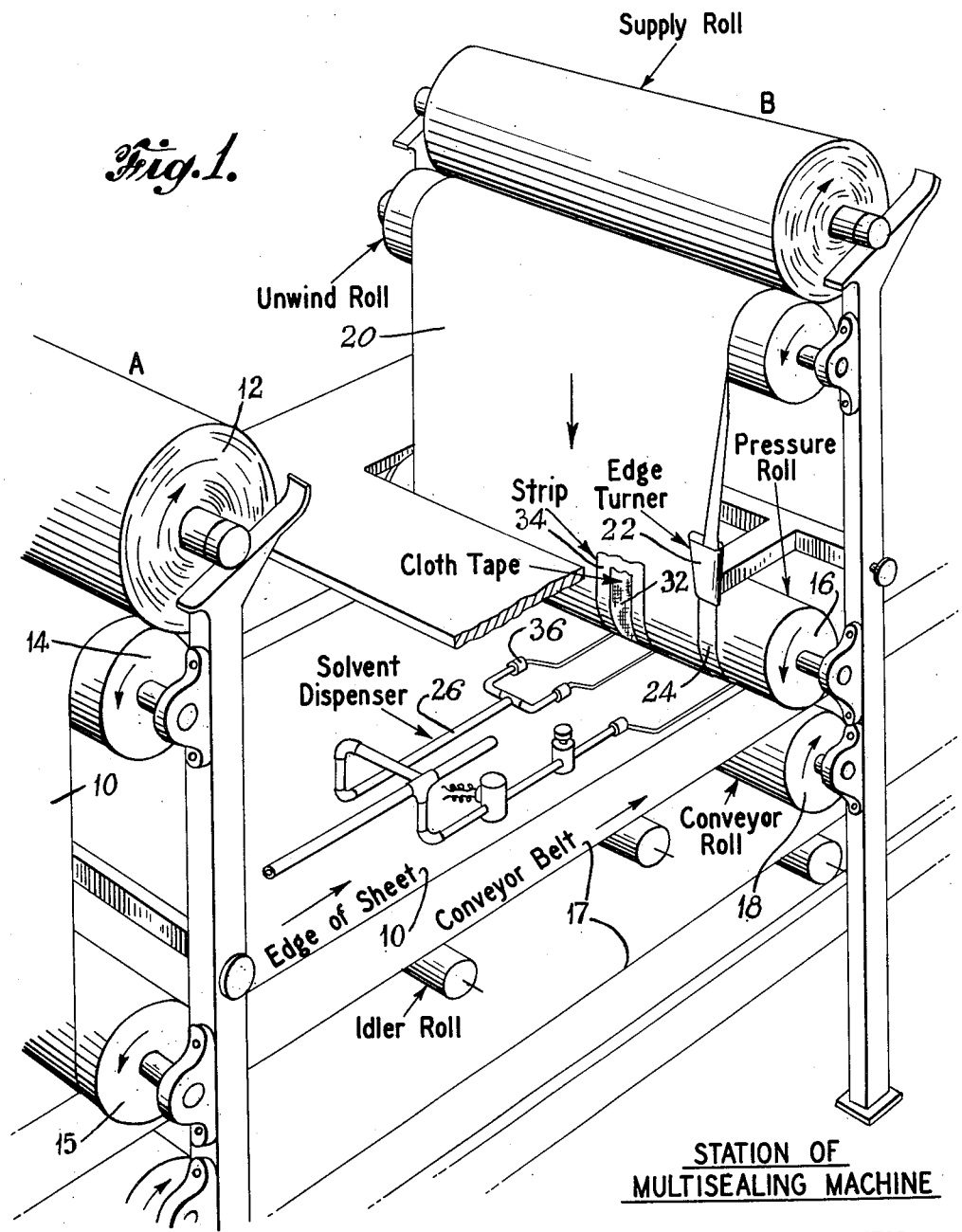
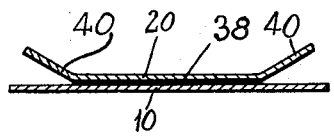
STATION OF
MULTISEALING MACHINE
INVENTOR
WILLIAM A. SEUBERT
BY Richard S. Shreve Jr.
ATTORNEY Dec. 11, 1962 W. A. SEUBERT 3,068,137
LARGE AREA FILM FABRICATION
Filed Dec. 23, 1957 2 Sheets-Sheet 2
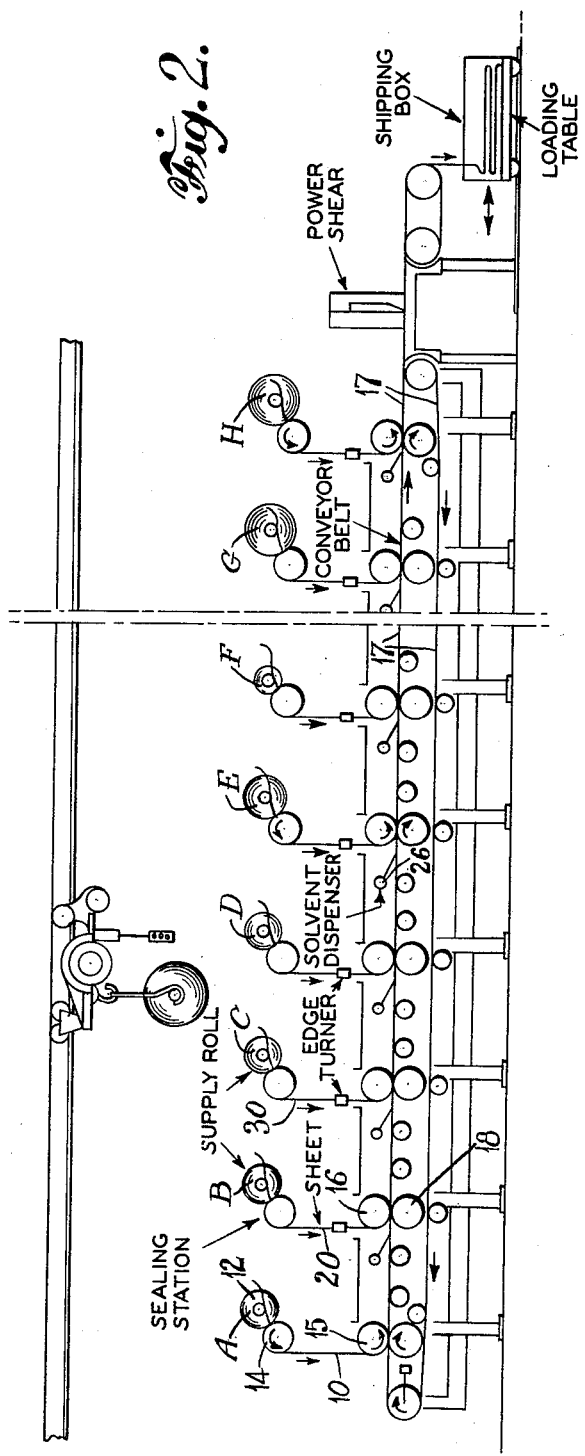
INVENTOR.
WILLIAM A. SEUBERT
BY
Richard S. Shreve
ATTORNEY United States Patent Office 3,068,137
Patented Dec. 11, 1962

3,068,137
LARGE AREA FILM FABRICATION
William A. Seubert, Trenton, N.J., assignor to Union Carbide Corporation, a corporation of New York
Filed Dec. 23, 1957, Ser. No. 704,578
7 Claims. (Cl. 156—201)

This invention relates to large area film fabrication, and constitutes an improvement upon the method according to the copending application of Charles E. Staff, Serial No. 650,380, filed April 3, 1957.

The need for wide widths of films, for example 40 and 60 feet wide for agricultural uses such as pond linings, haystack covers, trench silo covers, silage bags, and also other potential uses indicates a need for a cheaper means of fabrication than is obtained by existing sealing processes.

According to said copending application the side margins of sheets in juxtaposed relation were simultaneously seam bonded to produce the wide film in a single pass. This involved difficulties in applying the adhesive to all of the sheets and passing them all together through one set of nip rolls, making it difficult to insure perfect seals for all of the sheets.

The main objects of the present invention are to avoid the difficulties referred to above, and to apply the sheets in succession so that each sheet is supplied to, and each seal is formed in a separate nip of a succession of nip rolls.

It has been found that large sheets used on haystacks tend to tear along the edge where held to the ground, or split across the top in moderate winds. It is, therefore, another object of the present invention to add reinforcement to the cover as the cover is being manufactured.

According to the present invention, a pair of individual lengths are continuously fed longitudinally and at the same speed into juxtaposed relation with their margins in contact at one side, the contacting margins are bonded together, another individual length is continuously fed at the same speed into juxtaposed relation with the nearer of said pair of lengths with a side margin of said other length in contact with the unbonded wide margin of said nearer length, and said last mentioned contacting margins are bonded together.

In the drawings:

FIG. 1 is a perspective view of unwinding and sealing sections of apparatus for large area film fabrication according to the preferred embodiment of the present invention;

FIG. 2 is a diagrammatic elevation of the entire apparatus;

FIG. 3 is a cross section through the superimposed sheets from the final stage of FIG. 2;

FIG. 4 is a modification of FIG. 3; and

FIG. 5 is an enlarged view of a portion of FIGS. 3 and 4.

FIG. 6 is an enlarged view of a modification of FIG. 5.

As shown in FIG. 1, a continuous length of sheet or film 10 is continuously unwound from a supply roll 12 at unwind station A, and passes over an unwind roll 14 and an idler roll 15 to the nip between pressure rolls 16 and 18. Preferably as in the form shown, the sheet 10 is supported by a conveyor belt 17 which passes over the conveyor roll 18 and under the pressure roll 16.

The rolls 16 and 18 constitute a part of sealing station B, which has a similar supply roll and unwind roll for supplying a second length 20 to the nip between the pressure rolls. The sheets 10 and 20 are thus brought into juxtaposed relation in passing through the nip.

The station B also is provided with an edge turner 22 which folds the side margin 24 of sheet 20 back upon itself along its length. Thus when the sheets 10 and 20 are juxtaposed, the folded margin 24 contacts the planar surface of the sheet 10. To permit the folded edge to register with the planar surface, the supply roll at station B should be offset to the right hand side.

The sealing station B is provided with sealing means 26 mounted ahead of the nip of the pressure rolls to cooperate therewith to effect a seal between the folded margin 24 and the planar side margin of the sheet 10. The sealing means employed depends upon the composition of the sheets, and may supply heat, such as by an electronic heater, but in the form shown the sealing means 26 is an adhesive applicator such as a solvent spreader.

As the sheets 10 and 20 pass between the pressure rolls 16 and 18, the folded margin 24 and the planar edge of the sheet 10 are bonded together, and the sheets 10 and 20 pass on the conveyor belt 17 to sealing station C as shown in FIG. 2. This station is similar in construction to station B with its supply, unwind and pressure rolls, for introducing a third sheet 30, except that the edge turner and sealing means are directed to fold back the left hand margin of the sheet 30. This condition continues alternately right and left hand through sealing stations D, E, F, G and H.

FIG. 1 also illustrates the introduction of the reinforcing means for the large area sheet. A narrow reinforcing strip, for example a cloth tape 32, is fed onto the sheet 10 and into the nip between the pressure rolls. A wider strip of sheet material 34 is fed over the strip 32 and under the sheet 20. Sealing means 36 such as solvent spreaders cooperate with the margins of the strip 34 on each side of the cloth tape 32, to seal them to the sheet 10 as they all pass through the nip, thus forming a pocket containing the tape 32. This reinforcing means may be selectively applied at any one or more of the sealing stations.

In the modification shown in FIG. 6, the narrow reinforcing strip 38 is a thick piece of vinyl tape, preferably a preformed three layer strip with a center layer of nylon cloth embedded in vinyl and outer layers of vinyl adhering thereto. This reinforcing strip 38 is fed onto the sheet 10 and into the nip between the pressure rolls. An adhesive spreader applies adhesive to the central portion of the underside of the strip 38, leaving the side margins 40 uncoated to insure that the adhesive will not spread enough to cause undesired adhesive to the sheet 20. The strip 38 is sealed to the sheet 10 as the sheets 10 and 20 pass through the nip.

The machine described herein continuously joins up to 14 sections of 54″ wide x about 4 to 20 mil thick sheet to produce up to 63 ft. wide flat sheet or up to 63 ft. circumference tubes in a single pass operation. Still larger widths and circumferences, say up to about 83 ft., can be produced by using wider, say 72″, feed sections; and virtually any desired width and circumference can be produced by installing additional sealing stations.

The machine can be adapted to utilize a variety of sealing techniques, and can therefore be used to join sheets of any sealable (or seamable) material.

The solvent or adhesive type sealing method is, all things considered, preferred for joining vinyl film and sheet containing vinyl chloride homopolymer and/or copolymer resins of many sorts. It is also suitable for joining many other types of film and sheet containing styrene homopolymer or copolymer resins, vinylidene chloride resins, cellulosic resins, acrylic resins, or the like; and for joining multi-ply and composite sheets such as can be prepared by laminating films to each other or to woven or felted webs of natural or synthetic fibers or by various coating methods; and can even be used to join polyethylenic films and composites. When polyethylenic surfaces are to be adhesive sealed, it is usually necessary to pre-treat said surfaces, as by subjecting them to a flame treatment or corona arc discharge, to improve their adhesive characteristics. Such treatment may be performed in advance; or suitable surface treating means may be installed directly in the fabricating machine of this invention ahead of the respective sealing stations.

Other types of sealing means may be substituted for the solvent or adhesive type depicted. For example, high-frequency heating (commonly called "electronic") means such as the rolling electrode arrangement illustrated in the copending Staff application may be used; or the film edges could be heat sealed together by direct heating means as with heated rotating wheels or discs so that only the to-be-seamed areas of the film sections passed between them. Electronic means are particularly useful for vinyl compositions, but are also suitable for cellulosic resin compositions, polyvinylidene chloride resin compositions, acrylic resin compositions and other fusible compositions having a power factor of at least about 0.01. Direct heat sealing means is operative for virtually any fusible composition, and is one of the preferred methods for polyethylene.

"Bead sealing" means such as described in the copending application of Haine and Chinn, Serial No. 594,929, filed June 29, 1956, now Patent No. 3,008,862, could be used. In this case the pressure rolls are arranged so that only the hot bead and films to be joined thereby pass therebetween.

What is claimed is:

1. Method for flat seam bonding together individual lengths of thermoplastic film or sheeting to form therefrom a bonded large area sheet, which comprises passing an outside one of said individual lengths from a supply roll through successive longitudinally spaced nips of pressure rolls, passing successive inside lengths of substantially the same width from respective supply rolls respectively to each of said successive nips, folding back on itself at least one of the edges along the length of at least one of said individual lengths after it leaves its supply roll and before it reaches its nip, and applying adhesive to the surface of one sheet contiguous to another sheet but leaving the other edge of said outside sheet free of any adhesive before they reach their respective nips, said nips successively bonding the folded edge of each sheet to the planar surface of a contiguous sheet.

2. Method for seam bonding together individual lengths of sheeting to form therefrom a bonded large area sheet which comprises continuously feeding pairs of individual lengths longitudinally at the same speed into successively juxtaposed relation with their margins in contact at one side, simultaneously feeding narrow reinforcing strips respectively longitudinally and at the same speed between pairs of juxtaposed lengths and between the side edges thereof, continuously bonding said contacting margins together and simultaneously bonding said narrow reinforcing strip to the adjacent length in contact with said reinforcing strip along a seam transversely spaced from said contacting margins.

3. Apparatus for bonding together, two at a time, lengths of substantially continuous sheet material which comprises a plurality of longitudinally spaced bonding stations, a plurality of supply rolls, one adjacent each of said bonding stations and each adapted to feed a single length of sheet material to its bonding station, means for conveying lengths of sheet material from a preceding station to a succeeding station, means at each succeeding bonding station for contacting and effecting the union of the sheet material from its respective supply roll with a free edge margin of the sheet material conveyed from the preceding bonding station, and means spaced before each succeeding station for folding back on itself the edge margin of the sheet material from the supply roll of that station which is to be contacted with the free edge margin of the sheet material conveyed from the preceding station prior to the contact of the two sheet materials.

4. Method for bonding together, two at a time, lengths of substantially continuous sheet material to form a large area sheet which comprises successively adding single lengths of substantially equal width sheet material to a single sheet material element comprising at least one length of sheet material, by first superposing and bonding two single lengths of sheet material together, at one pair of facing edge margins thereof, then moving the resulting sheet material element through a distance and superposing and bonding onto the sheet material element another single length of sheet material at the free edge margin of the adjacent length of the sheet material element, folding over the edge margin of each successive length of sheet material to a position between the length of sheet material and the sheet material element prior to that edge margin being bonded to the sheet material element, and successively moving the sheet material element through a distance, superposing and bonding further single lengths of sheet material at the free edge margin of the adjacent length of the sheet material element until a sheet material element having the desired number of sheet material lengths is obtained.

5. Apparatus claimed in claim 3 wherein the means for contacting and effecting the union of the sheet materials comprises a pair of nip rolls.

6. Apparatus claimed in claim 5 in combination with means spaced a distance from the nip rolls for applying an adhesion promoting liquid at the interface of the folded over edge margin of the sheet material from the supply roll and the free edge margin of the sheet material conveyed from the preceding station at a point prior to the contact of the two sheet materials.

7. Method claimed in claim 4 wherein a longitudinal reinforcement is interposed between the layers comprising the sheet material element and the single length of sheet material and is bonded to one of said layers as the layers are themselves bonded to one another at a facing pair of edge margins.

References Cited in the file of this patent

UNITED STATES PATENTS

| | | |
|---|---|---|
| 1,978,912 | Repony | Oct. 30, 1934 |
| 2,285,447 | Lichter | June 9, 1942 |
| 2,306,178 | Meany | Dec. 22, 1942 |
| 2,474,770 | Yount | June 28, 1949 |
| 2,511,031 | Yount | June 13, 1950 |
| 2,538,520 | Holt | Jan. 16, 1951 |
| 2,633,286 | Claridge | Mar. 31, 1953 |
| 2,656,293 | Huch | Oct. 20, 1953 |
| 2,771,121 | MacCaffray | Nov. 20, 1956 |

FOREIGN PATENTS

| | | |
|---|---|---|
| 200,241 | Australia | Jan. 27, 1955 |

UNITED STATES PATENT OFFICE
CERTIFICATE OF CORRECTION

Patent No. 3,068,137　　　　　　　　　　　　　　　December 11, 1962

William A. Seubert

It is hereby certified that error appears in the above numbered patent requiring correction and that the said Letters Patent should read as corrected below.

Column 3, line 61, after "between", first occurrence, insert -- said --; column 4, line 31, for "pror" read -- prior --.

Signed and sealed this 9th day of July 1963.

(SEAL)
Attest:

ERNEST W. SWIDER　　　　　　　　　　　　　　　DAVID L. LADD
Attesting Officer　　　　　　　　　　　　　　　Commissioner of Patents